United States Patent [19]

Arntzen

[11] Patent Number: 4,854,269

[45] Date of Patent: Aug. 8, 1989

[54] MEANS FOR EXERCISING DOGS FROM A BICYCLE

[76] Inventor: Sven Arntzen, Lofsrudhogda 235, N-1281 Oslo 12, Norway

[21] Appl. No.: 143,849

[22] PCT Filed: Jun. 12, 1987

[86] PCT No.: PCT/NO87/00047

§ 371 Date: Jan. 4, 1988

§ 102(e) Date: Jan. 4, 1988

[87] PCT Pub. No.: WO87/07834

PCT Pub. Date: Dec. 30, 1987

[30] Foreign Application Priority Data

Jun. 12, 1986 [NO] Norway .................. 86.2400
Feb. 13, 1987 [NO] Norway .................. 87.2339

[51] Int. Cl.$^4$ ............................................. A01K 15/02
[52] U.S. Cl. ..................................... 119/29; 119/109
[58] Field of Search ................ 119/29, 106, 109, 114, 119/120, 121, 122, 96; 224/31, 37, 39; 54/71; 248/229, 230; 40/613, 608, 651

[56] References Cited

U.S. PATENT DOCUMENTS 4,134,364  1/1979  Boncela .......................... 119/29

Primary Examiner—Robert P. Swiatek
Assistant Examiner—Nicholas D. Lucchesi
Attorney, Agent, or Firm—Hedman, Gibson, Costigan & Hoare

[57] ABSTRACT

Apparatus for exercising a dog from a bicycle which includes a bar clamped to the frame of the bicycle and a second bar attached to the first bar through a spring or similar device at one end and to the collar of the dog at an opposed end, wherein when the collar is subject to a sudden pull, the second bar moves in the direction of the pull to thereby prevent injury to the dog.

19 Claims, 4 Drawing Sheets

MEANS FOR EXERCISING DOGS FROM A BICYCLE

FIELD OF THE INVENTION

The present invention is generally directed to an exercising device for dogs which is attached to a bicycle, tricycle or similar moving vehicle enabling the user to operate the vehicle and exercise the dog in a safe and efficient manner.

BACKGROUND OF THE INVENTION

Many people exercise their dogs by taking them for a walk. However, it is known that walking a dog does not provide the dog with sufficient exercise unless the dog is walked for extensive periods of time. However, most people do not take a dog for a lengthy walk because it is too exhausting or too boring.

The alternative is to exercise the dog while riding a bicycle. This is done by pedaling in the customary manner while holding the dog's leash in one hand or attaching the leash to the handle bars or other portion of the bicycle frame.

While this manner of exercise provides the dog with an excellent workout, it does however, subject both the dog and rider to possible serious injury. For example, the rider and/or dog may be injured if the dog should accidentally suddenly pull away from the bicycle or bump into the wheels or pedals. It is obvious that even a minor tug by the dog can cause the rider to lose control of the bicycle.

The dog may also be injured if either the dog or the bicycle comes to an abrupt halt. This can cause the leash to strangle the dog and topple the bicycle. In addition, if the leash should become entangled in the pedals, the dog may be strangled as well.

It is thus apparent that despite the benefits of exercising a dog while riding a bicycle, the dangers of this form of exercise far outweigh the benefits.

An attempt at overcoming these problems is disclosed in Boncela, U.S. Pat. No. 4,134,364 in which a stand-off bar is mounted to the frame of the bicycle having attached thereto an upright pin, preferably made of a resilient material which is adapted to deflect when the chain is pulled abnormally hard. Although this feature prevents strangulation of the dog, it fails to provide a device which is resilient and which readily adjusts to the movement of the dog while keeping the dog a safe distance from the pedals and the wheels.

It is therefore an object of the invention to provide a device for exercising a dog while riding a bicycle in which the dog can not interfere with the rider.

It is another object of the invention to provide a device which is resilient and provides controlled resistance to the movement of the dog.

SUMMARY OF THE INVENTION

The present invention is directed to an apparatus for exercising a dog from a moving vehicle comprising:

(a) bracket means adapted to be attached to the vehicle;

(b) first bar means mounted to the bracket and extending outward away from the vehicle;

(c) second bar means (d) resilient means connected to the first bar means at one end and to attachment means at an opposed end;

(e) attachment means adapted to have releasably attached thereto a leash of the dog, wherein when a force is exerted by the leash on the dog sufficient to cause injury, said leash is adapted to disengage from the device, and wherein when a force is exerted by the leash on the dog, said resilient means is adapted to move in the direction of the force being applied to the dog to thereby at least reduce the force conveyed to the dog.

BRIEF DESCRIPTION OF THE DRAWINGS

The following drawings in which like reference characters illustrate like parts are illustrative of embodiments of the invention and are not intended to limit the scope of the invention as set forth in the claims forming part of the application.

DETAILED DESCRIPTION OF THE INVENTION

Figure 1:
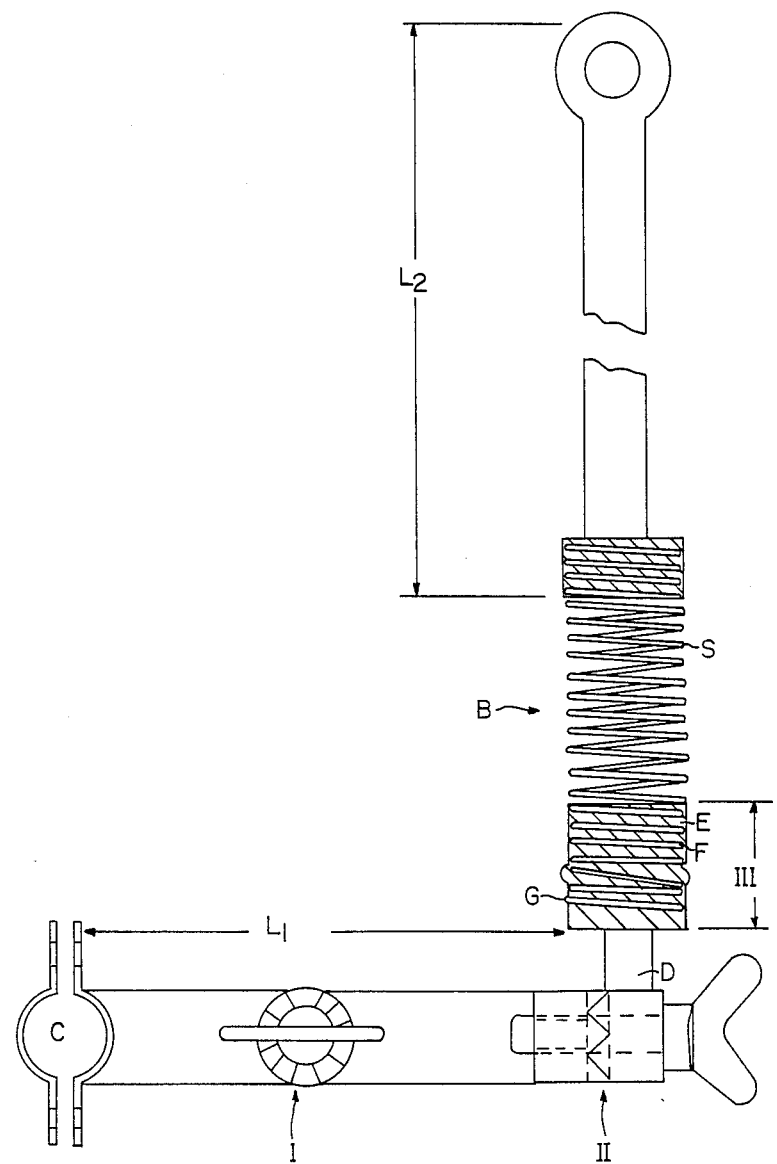
FIG. 1 is a cross-sectional view of one embodiment of the invention showing a second bar having resilient means at an end thereof extending perpendicular to the first bar.
Figure 2:
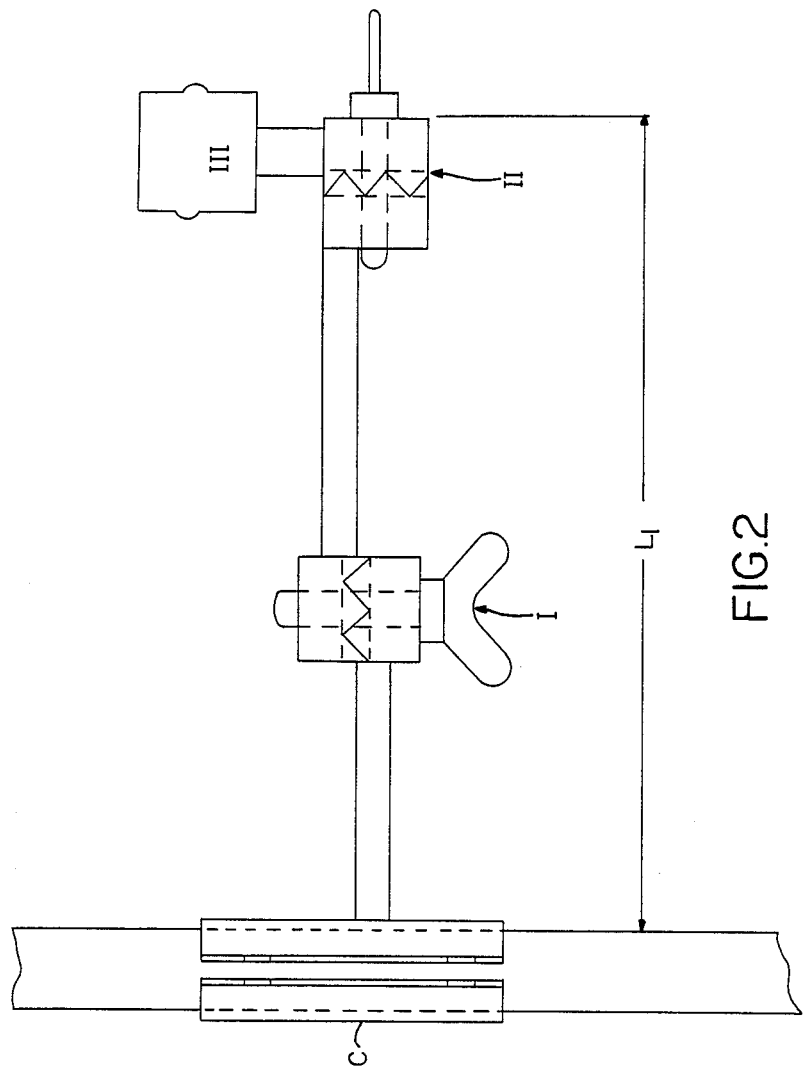
FIG. 2 is a bottom view of the embodiment shown in FIG. 1.

Referring to the drawings and particularly to FIGS. 1 and 2, the device according to the present invention includes a bracket (C) adapted to be attached to the frame of the bicycle away from the pedals and preferably as close to the ground as possible. Extending outward and essentially perpendicular from the frame is a first bar ($L_1$). The length of the first bar ($L_1$) determines the distance between the dog and the frame of the bicycle when the exercising device is attached to the dog through a leash.

The bar ($L_2$) is attached to the bar ($L_1$) through a resilient means (B) such as a spring (S) as shown specifically in FIG. 1 and a fastening device (III). The fastening device is secured to the first bar ($L_1$) through a bolt (D) or other suitable device and includes a block (E) having grooves (F) on the exterior surface for securely retaining therein individual turns (G) of the spring (S). A similar block (E) is mounted to the second bar ($L_2$) for securing the spring (S) thereto.

The bar ($L_1$) is provided with an adjustment mechanism (I) as shown in FIGS. 1 and 2 which is adapted to regulate the incline of the bar ($L_2$) to thereby adjust the distance of the dog from the bicycle. There is also provided a second adjustment mechanism (II) which also serves to adjust the incline of the bar ($L_2$).

In accordance with the invention the length of the bars ($L_1$) and ($L_2$) may be adjusted to accomodate the size of the frame of the bicycle and the resiliency or strength of the spring (S) can be adjusted to accommodate the size of the dog to be exercised. Thus, in a preferred embodiment, the spring (S) may be easily removed and replaced according to the needs of the user.

The fastening device (III) of the invention as previously described may be constructed so as to permit the spring (S) to come out of the grooves (F) when the spring (S) is subjected to an excessive load.

The adjustment mechanisms (I) and (II) may be replaced by a single, adjustable joint (e.g. a ball joint) to achieve the same functions as the individual adjustment mechanisms I and II as previously described. The single adjustment joint may be affixed to the bar ($L_1$).

Figure 3:
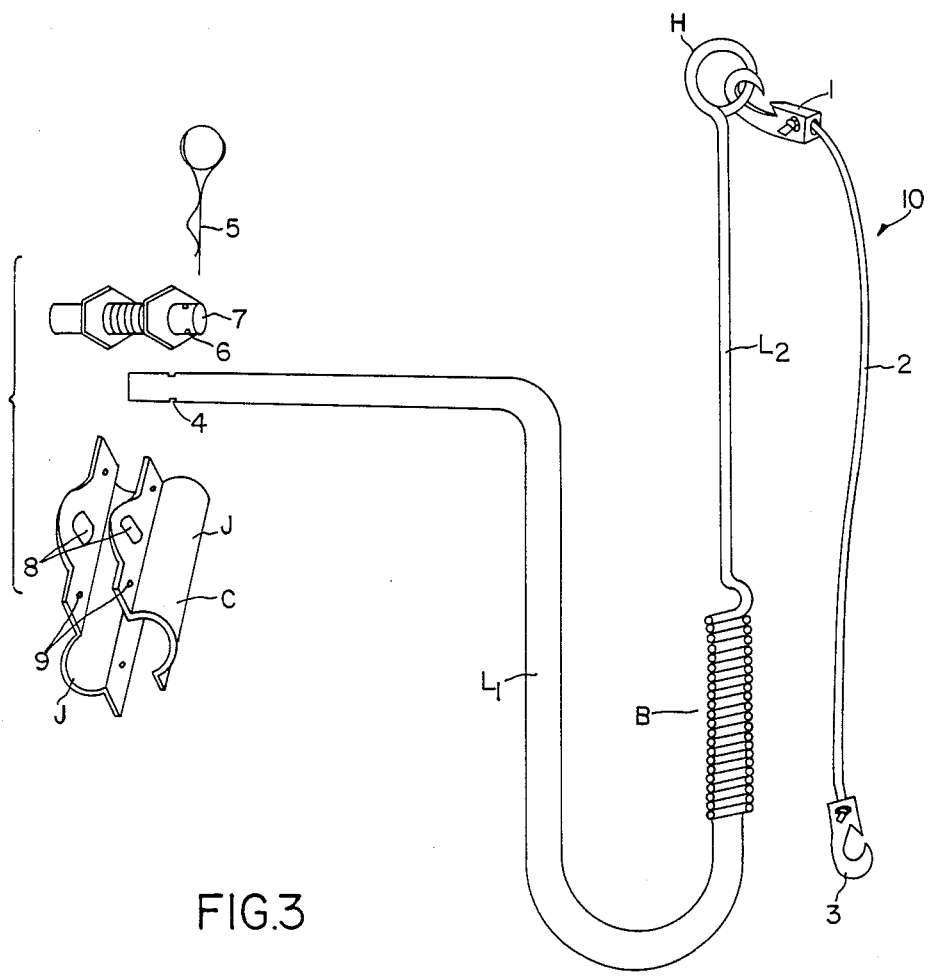
FIG. 3 is a perspective view of another embodiment of the invention having a U-shaped configuration.

Referring to FIG. 3, there is disclosed another embodiment of the invention wherein the bar ($L_1$) is rigid and has a U-shape. The resilient means (B) and the bar ($L_2$) may be formed integral with each other. The bar ($L_2$) may be provided at one end with a loop (H). An attachment device 10 is secured to the loop (H) of the bar ($L_2$) and includes a first hook 1 for removably attaching to the loop (H) and a second hook 3 which is adapted to removably attach to the collar of the dog. The hooks 1 and 3 are preferably affixed to an elastic member 2 such as a rubber band or similar member. The hooks 1 and 3 are adapted to instantaneously disengage from the loop (H) and the collar of the dog, respectively when subjected to a heavy load if the dog or bicycle should hit a stationary object such as a tree wherein the dog will be easily disengaged from the device to thereby prevent injury.

In the embodiment shown in FIG. 3, the bar ($L_1$) may be provided with a bore or hole 4 at an end remote from the resilient means (B) for the purpose of securing a bracket (C) to the frame of the bicycle. The hole is adapted to receive the end of a securing means 5 shown in FIG. 3. The securing means 5 is also placed through a corresponding hole 6 in a fastening bolt 7 which is sized to fit with the end of the bar ($L_1$).

The bracket (C) is provided with bolt holes 9 which receive fastening bolts or screws (not shown). The respective opposed portions (J) of the bracket (C) are adapted to be secured about the generally cylindrical frame of the bicycle. The bracket (C) may also be provided with a protective lining (not shown) on the inner surface of the portions (J) to protect the frame of the bicycle.

A preferred fastening arrangement for the bar ($L_1$) comprises a support prop which may be fastened in one end of the fastening bolt 7 which may have an oblong shape and has in a rearward end a W-shaped fastening bracket for securing the device to the back wheel supports of the bicycle. Such a device is suited to prevent the bar ($L_1$) from twisting about the frame when subjected to a heavy load.

Figure 4:
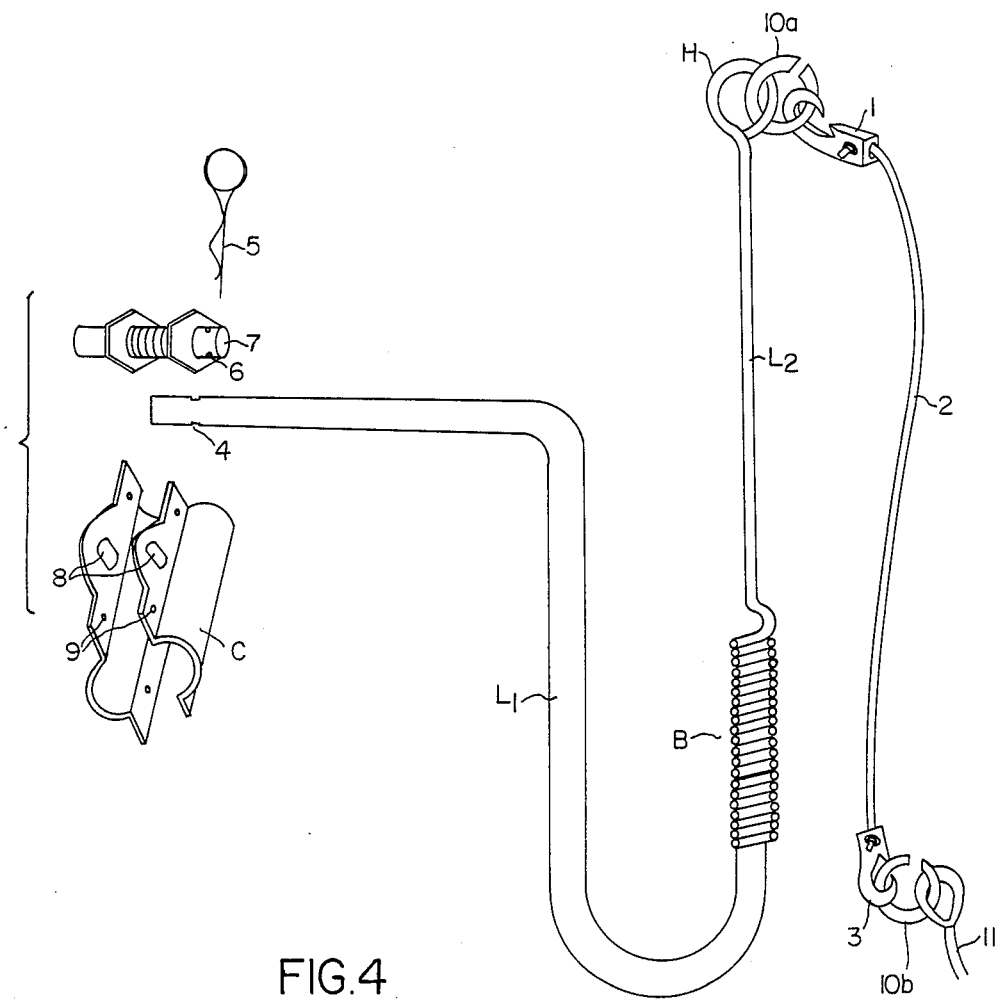
FIG. 4 is a perspective view of the embodiment shown in FIG. 3 with split rings for disengaging the dog from the apparatus.

Referring to FIG. 4 there is shown an embodiment of the invention similar to FIG. 3 which employs a safety device such as a split ring capable of instantaneously disengaging the dog from the apparatus. Such a device may be placed between the loop (H) and the carabine hook 1, and/or the carabine hook 3 and the leash of the dog 11. As shown in FIG. 4, the split 10a is positioned between the loop (H) and the hook 1 and the split ring 10b is positioned between the hook 3 and the leash 11. Either or both split rings may be used.

The safety device is adapted to free the dog instantly under a load which would otherwise injure the dog such as if the leash becomes stuck or entangled in a stationary object such as a tree.

The device of the present invention is desirably constructed from suitable rigid materials which do not add significantly to the weight of the bicycle. Materials should also be selected which facilitate repair and replacement of the device. Galvanized steel and various synthetic materials are suitable for this purpose.

I claim:

1. Apparatus for exercising a dog from a moving vehicle comprising:
   (a) bracket means adapted to be attached to the vehicle;
   (b) first bar means mounted to the bracket means and extending outward away from the vehicle;
   (c) second bar means;
   (d) resilient means connected at one end to the first bar means and at an opposed end to the second bar means end; and
   (e) attachment means connected to the second bar means and adapted to have releasably attached thereto a leash of the dog, wherein when a force is exerted by the leash on the dog sufficient to cause injury, said leash is adapted to be disengaged from the attachment means thereby disengaging the dog from the apparatus, and wherein when a force is exerted by the leash on the dog said resilient means is adapted to move in the direction of the force being applied to the dog to thereby at least reduce the force conveyed to the dog.

2. The apparatus of claim 1 wherein the vehicle is a bicycle or tricycle and the bracket means is attached to the vehicle in a position remote from the pedals.

3. The apparatus of claim 1 further comprising means for adjusting the length of the first bar means to thereby adjust the distance from the vehicle to the point of attachment of the leash.

4. The apparatus of claim 1 wherein the resilient means comprises a spring means.

5. The apparatus of claim 1 wherein the second bar means is inclined with respect to the first bar means, said apparatus further comprising means for adjusting the degree of incline of the second bar means.

6. The apparatus of claim 4 wherein the resiliency of the spring means is correlated to the size and strength of the dog.

7. The apparatus of claim 1 wherein the resilient means is integral with the second bar means.

8. The apparatus of claim 1 wherein the resilient means is adapted to disengage from the second bar means under severe loads.

9. The apparatus of claim 5 wherein the first bar means has a U-shape.

10. The apparatus of claim 1 further comprising elastic means adapted to provide a releasable connection between the leash or a collar of the dog and the attachment means, said elastic means comprising first and second hook means, one of said hook means releasably connected to the attachment means and the other of said hook means releasably connected to the leash or the collar of the dog.

11. The apparatus of claim 10 wherein the first hook means is adapted to disengage from the attachment means when subjected to a severe force.

12. The apparatus of claim 10 wherein the second hook means is adapted to disengage from the leash when subjected to a severe force.

13. The apparatus of claim 1 wherein the bracket is attached to a lower portion of the vehicle.

14. The apparatus of claim 1 further comprising hook means mounted to the leash and adapted to be releasably connected to the attachment means.

15. The apparatus of claim 14 wherein said hook means is deformable and adapted to disengage from the attachment means when the force exerted by the leash is sufficient to cause injury to the dog.

16. The apparatus of claim 14, wherein the attachment means comprises a loop for releasably receiving the hook means.

17. The apparatus of claim 16 wherein the attachment means further comprises a first split ring releasably secured to the loop and to the hook means wherein when a force is exerted on the leash sufficient to injure the dog, the first split ring disengages from either the loop or the hook means to thereby disengage the dog from the apparatus.

18. The apparatus of claim 1 further comprising second hook means attached to the leash and adapted to be releasably connected to a collar of the dog.

19. The apparatus of claim 18 further comprising a second split ring releasably secured to the collar and the second hook means wherein when a force is exerted on the leash sufficient to injure the dog, the split ring disengages either from the collar or from the second hook means to thereby disengage the dog from the apparatus.

* * * * *